United States Patent [19]
Yao et al.

[11] Patent Number: 6,090,990
[45] Date of Patent: Jul. 18, 2000

[54] METHOD OF MAKING AN IMPROVED CATALYST CONTAINING ZEOLITE TREATED WITH BORON TRICHLORIDE, THE PRODUCT FROM SUCH METHOD, AND THE USE THEREOF IN THE CONVERSION OF HYDROCARBONS

[75] Inventors: Jianhua Yao, Bartlesville; Charles A. Drake, Nowata, both of Okla.

[73] Assignee: Phillips Petroleum Company, Bartlesville, Okla.

[21] Appl. No.: 09/035,198

[22] Filed: Mar. 5, 1998

[51] Int. Cl.[7] .............................. C07C 2/52; C07C 4/02; C10G 35/06
[52] U.S. Cl. ...................... 585/418; 585/653; 585/906; 208/120.01; 208/135
[58] Field of Search .................................... 585/418, 653, 585/906; 208/120.01, 135

[56] References Cited

U.S. PATENT DOCUMENTS

| 4,613,720 | 9/1986 | Bonifaz et al. | 585/640 |
| 4,711,970 | 12/1987 | Chang et al. | 585/415 |
| 4,751,341 | 6/1988 | Rodewald | 585/533 |

*Primary Examiner*—Walter D. Griffin
*Assistant Examiner*—Thuan D. Dang
*Attorney, Agent, or Firm*—Charles W. Stewart; Reece A. Scott

[57] ABSTRACT

An improved zeolite based catalyst comprising a mixture of a zeolite and a binder treated with boron trichloride and prepared by a novel method including exposing a mixture of a zeolite material and a binder to gaseous boron trichloride under suitable process conditions.

10 Claims, No Drawings

METHOD OF MAKING AN IMPROVED CATALYST CONTAINING ZEOLITE TREATED WITH BORON TRICHLORIDE, THE PRODUCT FROM SUCH METHOD, AND THE USE THEREOF IN THE CONVERSION OF HYDROCARBONS

The invention relates to a method of making an improved catalyst containing zeolite treated with boron trichloride used for converting nonaromatic hydrocarbons to aromatic and lower olefin hydrocarbons with the conversion product preferably having an enhanced olefin to aromatics ratio.

BACKGROUND OF THE INVENTION

It is known to catalytically crack non-aromatic gasoline boiling range hydrocarbons (in particular paraffin and olefins) to lower olefins (such as ethylene and propylene) and aromatic hydrocarbons (such as benzene, toluene, and xylenes) in the presence of catalysts which contain a zeolite (such as ZSM- 5), as is described in an article by N. Y. Chen et al. in Industrial & Engineering Chemistry Process Design and Development, Volume 25, 1986, pages 151–155. The reaction product of this catalytic cracking process contains a multitude of hydrocarbons such as unconverted $C_5+$ alkanes, lower alkanes (methane, ethane, propane), lower alkenes (ethylene and propylene), $C_6$–$C_8$ aromatic hydrocarbons (benzene, toluene, xylenes, and ethylbenzene), and $C_9+$ aromatic hydrocarbons. Depending upon the relative market prices of the individual reaction products, it can be desirable to increase the yield of certain of the more valuable products relative to the others.

SUMMARY OF THE INVENTION

It is an object of the inventive method to provide an improved catalyst containing a mixture of zeolite and a binder treated with boron trichloride which when used in the conversion of hydrocarbons to ethylene, propylene and BTX (benzene, toluene, xylene and ethylbenzene) aromatics gives a product having an enhanced olefin and BTX yield and olefin to BTX ratio.

The inventive method provides for an improved hydrocarbon conversion catalyst prepared by exposing a mixture of a zeolite and a binder to an atmosphere of a gaseous mixture comprising an inert gas and boron trichloride under high temperature conditions and for a time period suitable for providing the improved catalyst. The catalyst prepared by the inventive method is used to convert hydrocarbons preferably to lower olefins and aromatics by contacting it under conversion conditions with a hydrocarbon feed.

Other objects and advantages of the invention will become apparent from the detailed description and the appended claims.

DETAILED DESCRIPTION OF THE INVENTION

It has been discovered that a zeolite based hydrocarbon conversion catalyst containing a zeolite, preferably a mixture of zeolite and a binder, which has been treated with boron trichloride, has improved properties over certain other zeolite based hydrocarbon conversion catalysts.

The improved zeolite based hydrocarbon conversion catalyst is prepared by exposing a zeolite material, preferably a mixture comprising zeolite and a binder, to a substantially gaseous atmosphere containing boron trichloride under process conditions that suitably provide for the catalyst. Any suitable means or method known to those skilled in the art can be used to contact the zeolite or mixture of zeolite and binder, with the boron trichloride.

The zeolite starting material used in the novel method for making the zeolite based hydrocarbon conversion catalyst can be any zeolite or zeolite material that is effective in the conversion of non-aromatics to aromatics when contacted under suitable reaction conditions with non-aromatic hydrocarbons. Preferably, the zeolite has a constraint index (as defined in U.S. Pat. No. 4,097,367, which is incorporated herein by reference) in the range of from about 0.4 to about 12, preferably about 2–9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 12:1 to about 100:1. Preferred zeolites include ZSM-5, ZSM-8, ZSM-11, ZSM-12, ZSM-35, ZSM-38, and mixtures thereof. Some of these zeolites are also known as "MFI" or "Pentasil" zeolites. The presently more preferred zeolite is ZSM-5.

A zeolite starting material, preferably a mixture comprising zeolite and a binder, is treated by contacting it with boron trichloride under process conditions that suitably provide a catalyst material having desired properties. The boron trichloride is preferably in gaseous form when it is contacted with the zeolite starting material and, most preferably, the boron trichloride contacted with the zeolite starting material is in a gaseous mixture containing boron trichloride and an inert gas. The inert gas of the gaseous mixture can be selected from the group consisting of nitrogen, carbon dioxide, water (i.e. steam) and mixtures of any two or more thereof. The preferred inert gas used in the gaseous mixture containing boron trichloride is nitrogen. For best results, the concentration of boron trichloride in the gaseous mixture should be in the range upwardly to about 50 mole percent of the gaseous mixture, preferably, from or about 2 mole percent to or about 30 mole percent and, most preferably, from 5 mole percent to 20 mole percent. The concentration of inert gas in the gaseous mixture can be in the range exceeding about 50 mole percent of the gaseous mixture, preferably, from or about 70 mole percent to or about 98 mole percent, and, most preferably, from 20 mole percent to 95 mole percent.

The pressure and temperature conditions under which the starting zeolite material is exposed or contacted with the gaseous mixture should be such as to provide a suitably treated zeolite having the desired catalytic properties. Generally, the treatment of the zeolite material is conducted at a pressure of from below atmospheric upwardly to about 1000 pounds per square inch absolute (psia). More typical pressures, however, are in the range of from or about atmospheric to or about 500 psia. The preferred treatment pressure is in the range of from atmospheric to 100 psia.

The temperature at which the starting zeolite material is exposed to the gaseous mixture is important in providing a properly treated zeolite having the desired catalytic properties and should generally be in the range of from or about 100° C. to or about 1000° C. Preferably, the treatment temperature is in the range of from or about 200° C. to or about 800° C. and, most preferably, it can range from 250° C. to 650° C.

The time period for exposing the starting zeolite material to the gaseous mixture must be sufficient to provide a suitably treated zeolite. Generally, the period for exposing the starting zeolite material to the gaseous mixture at appropriate temperature and pressure conditions can range from or about 1 minute to or about 10 hours. Preferably, this treatment is conducted for a period of from or about 3 minutes to about 8 hours and, most preferably, from 5 minutes to 2 hours.

It has been found that, unexpectedly, the treatment of a mixture of zeolite starting material and a binder with boron trichloride provides for a catalyst having properties superior to those of zeolite material that has not been composited with a binder prior to its treatment with boron trichloride. Thus, an important aspect of the invention is for the zeolite starting material to be composited or admixed with a binder prior to the boron trichloride treatment of the mixture of zeolite and binder. By treating the admixture of zeolite and binder, as opposed to treating the zeolite alone prior to admixing with a binder, a catalyst results that provides for a significant improvement in the olefin-to- BTX ratio of the product from a hydrocarbon conversion process which utilizes such catalyst.

The binder that is combined or mixed with the zeolite starting material can be any suitable material having binding properties and which provides a finally prepared catalyst, i.e., after boron trichloride treatment, having the desired properties. Examples of suitable binder materials include those selected from the group consisting of calcium aluminate, bentonite, kaolin, alumina, silica, colloidal silica, sodium silicate, titania, zirconia, aluminosilicates (e.g. clays), zinc aluminate, zinc titanate, metal oxides and any two or more thereof. The preferred binders are those selected from the group consisting of alumina, silica, aluminosilicates, bentonite and any two or more thereof. The most preferred binder is alumina.

The relative amounts of zeolite material and binder in the mixture to be treated with boron trichloride should be such as to give a treated material having the desired catalytic properties. Generally, the mixture of zeolite and binder to be treated with boron trichloride has a concentration of zeolite from or about 40 to or about 99.5 weight percent of the mixture, preferably, from or about 50 to or about 99 weight percent of the mixture and, most preferably, from 60 to 98.5 weight percent. The binder present in the mixture can be in the range upwardly to or about 60 weight percent of the mixture, preferably, from or about 1 to or about 50 weight percent and, most preferably, from 1.5 weight percent to 40 weight percent.

Any suitable means for mixing the zeolite and binder can be used to achieve the desired dispersion of the materials in the resulting admixture. Many of the possible mixing means suitable for use in preparing the mixture of zeolite and binder of the inventive method are described in detail in *Perry's Chemical Engineers' Handbook, Sixth Edition*, published by McGraw-Hill, Inc., at pages 19–14 through 19–24, which pages are incorporated herein by reference. Thus, suitable mixing means can include, but are not limited to, such devices as tumblers, stationary shells or troughs, Muller mixers, which are either batch type or continuous type, impact mixers, and the like.

It can be desirable to form an agglomerate of the mixture of zeolite and binder to be treated with the boron trichloride. Any suitable means known by those skilled in the art for forming such an agglomerate can be used. Such methods include, for example, molding, tableting, pressing, pelletizing, extruding, tumbling, and densifying.

Any suitable hydrocarbon feedstock which comprises paraffins (alkanes) and/or olefins (alkenes) and/or naphthenes (cycloalkanes), wherein each of these hydrocarbons contains 2–16 carbon atoms per molecule can be used as the feed to be contacted with the improved composition under suitable process conditions for obtaining a reaction product comprising lower alkenes containing 2–5 carbon atoms per molecule and aromatic hydrocarbons. Frequently, these feedstocks also contain aromatic hydrocarbons. Non-limiting examples of suitable, available feedstocks include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred feed is a gasoline-boiling range hydrocarbon feedstock suitable for use as at least a gasoline blend stock generally having a boiling range of about 30–210° C. Generally, the content of paraffins exceeds the combined content of olefins, naphthenes and aromatics (if present).

The hydrocarbon feed stream can be contacted by any suitable manner with the improved composition described herein contained within a reaction zone. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst.

The contacting step is preferably carried out within a conversion reaction zone, wherein is contained the improved composition, and under reaction conditions that suitably promote the formation of olefins, preferably light olefins, and aromatics, preferably BTX, from at least a portion of the hydrocarbons of the hydrocarbon feed. The reaction temperature of the contacting step is more particularly in the range of from about 400° C. to about 800° C., preferably, from about 450° C. to about 750° C. and, most preferably, from 500° C. to 700° C. The contacting pressure can range from subatmospheric pressure upwardly to about 500 psia, preferably, from about atmospheric to about to about 450 psia and, most preferably, from 20 psia to 400 psia.

The flow rate at which the hydrocarbon feed is charged to the conversion reaction zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon feed is charged to the conversion reaction zone in pounds per hour divided by the pounds of catalyst contained in the conversion reaction zone to which the hydrocarbon is charged. The preferred WHSV of the feed to the conversion reaction zone or contacting zone can be in the range of from about 0.25 hour$^{-1}$ to about 250 hour$^{-1}$ and, most preferably, from 0.5 hour$^{-1}$ to 100 hour$^{-1}$.

The following examples are presented to further illustrate this invention and are not to be construed as unduly limiting its scope.

EXAMPLE I

This example illustrates the preparation of several catalysts which were subsequently tested as catalysts in the conversion of a gasoline sample, which had been produced in a commercial fluidized catalytic cracking unit (FCC), to aromatics.

Catalyst A 10 g of ZSM-5 zeolite obtained from UCI (United Catalysts, Inc., Louisville, Ky.) having a product designation of T-4480 (obtained as a 1/16 inch extrudate) was flushed in N₂ (150 ml/min) at 500° C. for 1 hr., then 20 ml/min of BF₃ was co-fed with N₂ to the T-4480 for 15 minutes at 500° C. After this treatment, T-4480 was flushed again in N₂ (150 ml/min) for another 3 hrs. at 500° C. to form the BF₃ treated T-4480 catalyst.

Catalyst B 11 g of ZSM-5 zeolite powder obtained from Chemie Uetikon AG, Uetikon, Switzerland having a product designation of Zeocat PZ2/50H (obtained as powder) was flushed in N₂ (150 ml/min) at 500° C. for 2 hours, then 20 ml/min of BCl₃ was co-fed with N₂ to the Zeocat PZ2/50H powder for 15 min at 500° C. After this treatment, the Zeocat PZ2/50H powder was flushed in N₂ for another hour to form BCl₃ treated Zeocat PZ2/50H powder material. 10 g of this BCl₃ treated Zeocat PZ2/50H powder material was mixed with 0.32 g of bentonite. Added to this mixture was a solution of 2.67 g of chlorhydrol (50% w/w solution, provided by Reheis, Inc.) in 7 ml of H₂O. The resultant material was dried at 120° C. for about 3 hours and calcined in air at 520° C. for 3 hours. The dried and calcined material was granulated to 10–20 mesh material.

Catalyst C 10 g of T-4480 was flushed in N₂ (150 ml/min) at 500° C. for 1 hour, then 20 ml/min of BCl₃ was co-fed with N₂ to the T-4480 for 15 min at 500° C. After this treatment, T-4480 was flushed in N₂ (150 ml/min) for another 2 hours at 500° C. to form the BCl₃ treated T-4480 catalyst.

Catalyst D 11 g of ZSM-5 zeolite, Zeocat PZ2/50H (obtained as a ¹⁄₁₆ inch extrudate with Al₂O₃ as binder) from Chemie Uetikon AG, Uetikon, Switzerland, was flushed in N₂ (150 ml/min) at 500° C. for 1 hour, then 20 ml/min of BCl₃ was co-fed with N₂ to the Zeocat PZ2/50H extrudate for 15 minutes at 500° C. After this treatment, the Zeocat PZ2/50H extrudate was flushed in N₂ (150 ml/min) for 2 hours at 500° C. to form the BCl₃ treated Zeocat PZ2/50H extrudate catalyst.

Catalyst E 11 g of Zeocat PZ2/50H (obtained as a ¹⁄₁₆ inch extrudate with Al₂O₃ as binder) was flushed in N₂ (150 ml/min) at 500° C. for 1 hour, then 20 ml/min of BCl₃ was co-fed with N₂ to the Zeocat PZ2/50H extrudates for 5 minutes at 500° C. After this treatment, Zeocat PZ2/50H extrudate was flushed in N₂ (150 ml/min) for 2 hours at 500° C. to form the BCl₃ treated Zeocat PZ2/50H extrudate catalyst.

EXAMPLE II

This example illustrates the use of the catalysts described in Example I as catalysts in the conversion of a gasoline feed to benzene, toluene and xylenes (BTX) and lower olefins (ethylene, propylene).

For each of the test runs, a 4.4 g sample of the catalyst materials described in Example I was placed into a stainless steel tube reactor (length: about 18 inches; inner diameter: about 0.5 inch). Gasoline boiling range feedstock from a catalytic cracking unit of a refinery was passed through the reactor at a flow rate of about 12 ml/hour, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of five test runs for Catalysts A through E are summarized in Table I. All test data were obtained after 6 hours on stream.

TABLE I

| Catalyst | BTX Yield | Sum of Light Olefin and BTX | | SumOlefin/BTX Yield | | Olefin BTX Ratio | |
|---|---|---|---|---|---|---|---|
| | | * | ** | * | ** | * | ** |
| A (Control) | 21.8 | 11.7 | 8.7 | 33.5 | 30.5 | 0.54 | 0.40 |
| B (Control) | 43.5 | 16.1 | 13.4 | 59.6 | 56.9 | 0.37 | 0.31 |
| C (Invention) | 31.1 | 26.2 | 21.1 | 57.3 | 52.2 | 0.84 | 0.68 |
| D (Invention) | 31.4 | 25.0 | 20.2 | 56.4 | 51.6 | 0.80 | 0.64 |
| E (Invention) | 39.9 | 23.0 | 19.3 | 62.9 | 59.2 | 0.58 | 0.48 |

\* Light Olefins = Ethylene + Propylene + Butenes
\*\* Light Olefins = Ethylene + Propylene The test data presented in Table I show that the inventive catalysts yield significantly more light olefins and a greater ratio of olefin to BTX than the Control Catalysts A and B. This improvement in catalyst performance is believed to be due to the presence of the binder in the mixture of zeolite and binder during treatment of the mixture with boron trichloride. It is noted that the Control Catalyst B is a zeolite treated with boron trichloride prior to mixing the thus-treated zeolite with a binder. The performance of control Catalyst B as compared to the inventive Catalysts C, D and E is inferior when comparing the light olefin yield and olefin to BTX ratio. This difference is certainly unexpected; since, the presence of a binder admixed with zeolite that is treated with boron trichloride would not have been expected to enhance the performance of the final catalyst. The results presented for Control Catalyst A which is a zeolite treated with boron trifluoride show that treatment of a zeolite with boron trifluoride, as opposed to treatment with boron trichloride, gives a catalyst that is significantly inferior to the inventive catalysts and, also, to the boron trichloride treated control catalyst.

Reasonable variations, modifications, and adaptations can be made within the scope of the disclosure and the appended claims without departing from the scope of this invention.

That which is claimed is:

1. A process comprising contacting under conversion conditions a hydrocarbon feed comprising hydrocarbons containing 2–16 carbon atoms per molecule with a composition prepared by a method comprising:

exposing a mixture comprising a zeolite and a binder to an atmosphere of a gaseous mixture comprising an inert gas and boron trichloride under temperature conditions and for a time period suitable for providing said catalyst wherein said conversion conditions include a reaction temperature in the range of from about 400° C. to about 800° C., a contacting pressure in the range of from subatmospheric pressure upwardly to about 500 psia, a charge rate of said hydrocarbon feed such that the weight hourly space velocity is in the range of from exceeding 0 hours$^{-1}$ upwardly to about 1000 hour$^{-1}$ to thereby provide a conversion product including aromatics and olefins.

2. A process as recited in claim 1 wherein said zeolite of said mixture is present at a concentration in the range of from about 40 to about 99.5 weight percent of said mixture and said binder of said mixture is present at a concentration in the range from about 1 weight percent to about 50 weight percent.

3. A process as recited in claim 2 wherein the concentration of boron trichloride in said gaseous mixture is in the range from about 2 mole percent to about 50 mole percent of the gaseous mixture and the concentration of said inert gas in said gaseous mixture is in the range exceeding about 50 mole percent of the gaseous mixture.

4. A method as recited in claim 3 wherein said binder is selected from the group consisting of calcium aluminate, bentonite, kaolin, alumina, silica, colloidal silica, sodium silicate, titania, zirconia, aluminosilicates, zinc aluminate, zinc titanate, and any two or more thereof.

5. A method as recited in claim 4 wherein said inert gas is nitrogen.

6. A method as recited in claim 5 wherein the temperature at which the exposing step is conducted is in the range of from about 100° C. to about 1000° C. and the time period for exposing said mixture to said atmosphere is in the range of from about 1 minute to about 10 hours.

7. A process comprising contacting under conversion conditions a hydrocarbon feed comprising hydrocarbons containing 2–16 carbon atoms per molecule with a composition comprising a mixture of zeolite and a binder, said mixture is treated with boron trichloride wherein said conversion conditions include a reaction temperature in the range of from about 400° C. to about 800° C., a contacting pressure in the range of from subatmospheric pressure upwardly to about 500 psia, a charge rate of said hydrocarbon feed such that the weight hourly space velocity is in the range of from exceeding 0 hour$^{-1}$ upwardly to about 1000 hour$^{-1}$ to thereby provide a conversion product including aromatics and olefins.

8. A process as recited in claim 7 wherein said zeolite of said mixture is present at a concentration in the range of from about 40 to about 99.5 weight percent of said mixture and said binder of said mixture is present at a concentration in the range from about 1 weight percent to about 50 weight percent.

9. A process as recited in claim 8 wherein said binder is selected from the group consisting of calcium aluminate, bentonite, kaolin, alumina, silica, colloidal silica, sodium silicate, titania, zirconia, aluminosilicates, zinc aluminate, zinc titanate, and any two or more thereof.

10. A process as recited in claim 9 wherein the treatment of said mixture includes exposing said mixture to an atmosphere of a gaseous mixture comprising boron trichloride at a temperature in the range of from about 100° C. to about 1000° C. and for a time period in the range of from about 1 minute to about 10 hours.

* * * * *